United States Patent
Tang et al.

(10) Patent No.: US 11,252,350 B2
(45) Date of Patent: Feb. 15, 2022

(54) IMAGE SENSOR, CAMERA MODULE, MOBILE TERMINAL, AND IMAGE ACQUISITION METHOD

(71) Applicant: GUANGDONG OPPO MOBILE TELECOMMUNICATIONS CORP., LTD., Dongguan (CN)

(72) Inventors: Cheng Tang, Dongguan (CN); Qiqun Zhou, Dongguan (CN); Gong Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/007,768

(22) Filed: Aug. 31, 2020

(65) Prior Publication Data

US 2021/0075983 A1 Mar. 11, 2021

Related U.S. Application Data

(63) Continuation of application No. PCT/CN2019/104973, filed on Sep. 9, 2019.

(51) Int. Cl.
*H04N 5/353* (2011.01)
*H04N 5/374* (2011.01)
(Continued)

(52) U.S. Cl.
CPC ......... *H04N 5/3537* (2013.01); *H04N 5/3696* (2013.01); *H04N 5/3745* (2013.01); *H04N 9/0451* (2018.08)

(58) Field of Classification Search
CPC .. H04N 5/3537; H04N 5/3745; H04N 5/3696; H04N 9/0451; H04N 5/3741;
(Continued)

(56) References Cited

U.S. PATENT DOCUMENTS 11,006,055 B2 * 5/2021 Sugiyama ................ H04N 5/33
2007/0024879 A1 2/2007 Hamilton et al.
(Continued)

FOREIGN PATENT DOCUMENTS

CN 101079966 A 11/2007
CN 102067585 A 5/2011
(Continued)

OTHER PUBLICATIONS

International Search Opinion issued in corresponding International Application No. PCT/CN2019/104973, dated Jun. 12, 2020, 11 pages.
(Continued)

*Primary Examiner* — Marly S Camargo

(74) *Attorney, Agent, or Firm* — Young Basile Hanlon & MacFarlane, P.C.

(57) ABSTRACT

An image sensor, a camera module, a mobile terminal, and an image acquisition method are provided in the present disclosure. The image sensor includes a repeating unit in a two-dimensional pixel array. The repeating unit includes a plurality of color pixels and a plurality of transparent pixels. In the repeating unit, the plurality of transparent pixels are disposed along a first diagonal line and one or more first parallel lines parallel to the first diagonal line, and the color pixels are disposed along a second diagonal line and one or more second parallel lines parallel to the second diagonal line. The first diagonal line is different from the second diagonal line.

18 Claims, 11 Drawing Sheets

(51) Int. Cl.
    *H04N 5/369*    (2011.01)
    *H04N 5/235*    (2006.01)
    *H04N 9/04*     (2006.01)
    *H04N 9/64*     (2006.01)
    *G06T 3/40*     (2006.01)
    *G06K 9/40*     (2006.01)
    *H04N 5/3745*   (2011.01)

(58) Field of Classification Search
    CPC ...... H04N 5/235; H04N 5/341; H04N 5/2353;
          H04N 5/332; H04N 9/04; H04N 9/04555;
          G06T 3/4015; G06T 3/40; G06T 7/00;
          G06K 9/40; G06K 9/00
    USPC ...... 348/216.1, 221.1, 222.1, 362, 277, 279,
          348/280, 273, 290, 342, 687; 382/167,
          382/162, 255, 264, 274
    See application file for complete search history.

(56) References Cited

U.S. PATENT DOCUMENTS

| | | | |
|---|---|---|---|
| 2008/0012969 | A1 | 1/2008 | Kasai et al. |
| 2008/0252558 | A1* | 10/2008 | Kim ........................ G09G 3/20 345/55 |
| 2010/0265370 | A1* | 10/2010 | Kumar ................... H04N 5/335 348/208.6 |
| 2013/0050520 | A1* | 12/2013 | Takeuchi ............. H04N 5/2353 348/222.1 |
| 2016/0198131 | A1* | 7/2016 | Wang ....................... H04N 9/04 |
| 2018/0343404 | A1* | 11/2018 | Hwang |
| 2018/0367745 | A1* | 12/2018 | Sugiyama ............. H04N 5/235 |
| 2019/0068929 | A1* | 2/2019 | Sato |
| 2019/0182458 | A1* | 6/2019 | Kawano ............... H04N 9/0451 |
| 2021/0278648 | A1* | 9/2021 | Dixon ................... G02B 21/00 |
| 2021/0344882 | A1* | 11/2021 | Park ..................... H04N 9/0454 |

FOREIGN PATENT DOCUMENTS

| | | |
|---|---|---|
| CN | 102197641 A | 9/2011 |
| CN | 102369721 A | 3/2012 |
| CN | 102396235 A | 3/2012 |
| WO | WO2010066381 A1 | 6/2010 |

OTHER PUBLICATIONS

Extended European Search Report for EP Application 19938111.2 dated Jul. 8, 2021. (9 pages).

\* cited by examiner

IMAGE SENSOR, CAMERA MODULE, MOBILE TERMINAL, AND IMAGE ACQUISITION METHOD

CROSS-REFERENCE TO RELATED APPLICATIONS

This application is continuation of International Application No. PCT/CN2019/104973, filed on Sep. 9, 2019, which is incorporated herein by reference in its entirety.

TECHNICAL FIELD

The present disclosure relates to the field of imaging, and more particular, to an image sensor, a camera module, a mobile terminal, and an image acquisition method.

BACKGROUND

Mobile phones and other electronic devices are often equipped with a camera module to realize the camera function. An image sensor is provided in the camera module. To take color images, color pixels are arranged in the image sensor, and the color pixels are arranged in the form of a Bayer array.

SUMMARY

Embodiments of the present disclosure provide an image sensor, a camera module, a mobile terminal, and an image acquisition method to control the first exposure time of the transparent pixels and the second exposure time of the color pixels, respectively.

One aspect of the present disclosure provides an image sensor. The image sensor includes a repeating unit in a two-dimensional pixel array. The repeating unit includes a plurality of color pixels and a plurality of transparent pixels. In the repeating unit, the plurality of transparent pixels are disposed along a first diagonal line and one or more first parallel lines parallel to the first diagonal line, and the color pixels are disposed along a second diagonal line and one or more second parallel lines parallel to the second diagonal line. The first diagonal line is different from the second diagonal line.

Another aspect of the present disclosure provides an image sensor. The image sensor includes a plurality of color pixels and a plurality of transparent pixels arranged in a matrix. The color pixels and the transparent pixels are disposed at intervals in rows and columns. A first exposure-control line electrically coupled to control terminals of exposure-control circuits of the transparent pixels in (2n−1)th and (2n)th rows, configured to control a first exposure time of transparent pixels in the (2n−1)th and (2n)th rows. A second exposure-control line electrically coupled to control terminals of exposure-control circuits of color pixels in the (2n−1)th and (2n)th rows, configured to control a second exposure time of the color pixels in the (2n−1)th and (2n)th rows. n is a natural number greater than or equal to 1.

Another aspect of the present disclosure provides an image acquisition method, which includes the following operations. An ambient illumination on an image sensor is acquired. The image sensor includes a plurality of color pixels and a plurality of transparent pixels. It is determined whether the ambient illumination is less than an illumination threshold. In response to the ambient illumination being less than an illumination threshold, a first exposure time on the plurality of transparent pixels is controlled to be shorter than a second exposure time on the plurality of color pixels. In response to the ambient illumination being greater than or equal to the illumination threshold, the first exposure time on the plurality of transparent pixels is controlled to be equal to the second exposure time on the plurality of color pixels.

Another aspect of the present disclosure provides a camera module. The camera module includes a lens configured to focus an illumination of an image onto the image sensor and the image sensor configured to convert the illumination to electric charges. The image sensor includes a plurality of color pixels and a plurality of transparent pixels arranged in a two-dimensional array. The plurality of transparent pixels are disposed along a first diagonal line and one or more first parallel lines parallel to the first diagonal line, and the color pixels are disposed along a second diagonal line and one or more second parallel lines parallel to the second diagonal line. The first diagonal line is different from the second diagonal line. The camera module further includes a circuit component configured to collect and transmit the electric charges, acquire electrical energy for the camera module, and transmit data.

Another aspect of the present disclosure provides a mobile terminal. The mobile terminal includes a camera module for sensing an image. The camera module includes a lens configured to focus an illumination of the image onto the image sensor, and the image sensor configured to convert the illumination to electric charges. The image sensor includes a plurality of color pixels and a plurality of transparent pixels arranged in a two-dimensional array. The plurality of transparent pixels are disposed along a first diagonal line and one or more first parallel lines parallel to the first diagonal line, and the color pixels are disposed along a second diagonal line and one or more second parallel lines parallel to the second diagonal line. The first diagonal line is different from the second diagonal line. The camera module also includes a circuit component configured to collect and transmit the electric charges, acquire electrical energy for the camera module, and transmit data. The mobile terminal further includes a processor, a memory, a display, and a structure component. The processor is configured to process the image acquired by the camera module. The memory is configured to store the image acquired by the camera module. The display component is configured to display the image acquired by the camera module. The structure component is configured to provide support to the camera module.

In the embodiments of the present disclosure, a first exposure time of the transparent pixels is controlled by a first exposure signal and a second exposure time of the color pixels is controlled by a second exposure signal. The first exposure time of the transparent pixels and the second exposure time of the color pixels can be controlled respectively and improve the image quality.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of the present disclosure.

FIG. 18 is another schematic diagram of an arrangement of pixels in a repeating unit according to an embodiment of the present disclosure;

FIG. 19 is another schematic diagram of an arrangement of pixels in a repeating unit according to an embodiment of the present disclosure;

DETAILED DESCRIPTION

Figure 1:
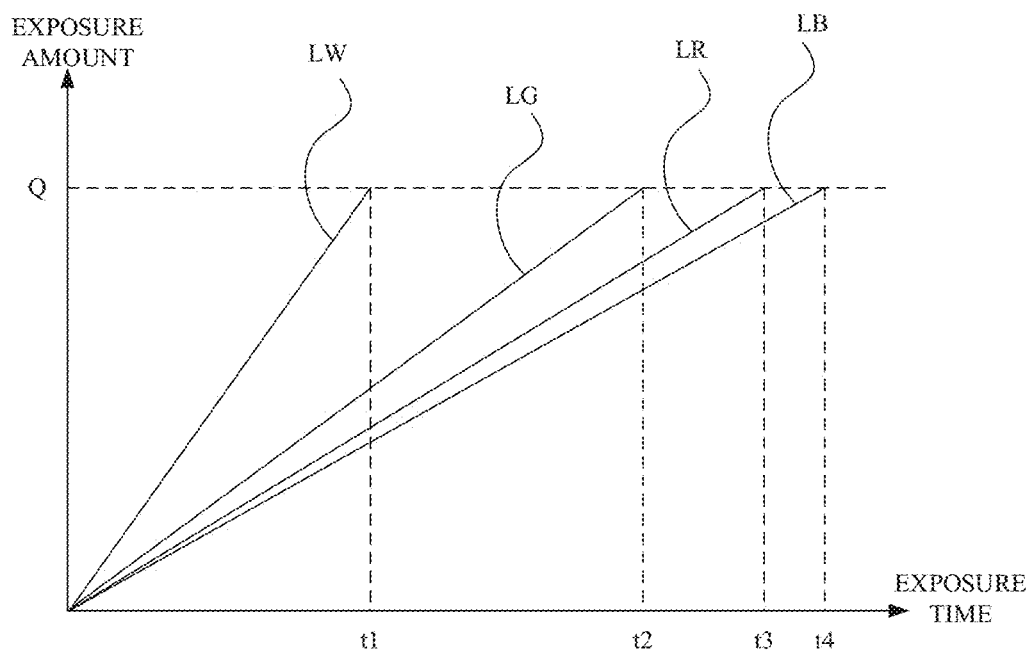
FIG. 1 is a schematic diagram of exposure saturation time of different color channels.

The technical solutions of the embodiments of the present disclosure will now be described clearly and completely taken in conjunction with the accompanying drawings; it will be apparent to one of ordinary skill in the art that, the embodiments described below are merely a part of the disclosure and other embodiments obtained out of them without creative work will fall into the protection range of the present disclosure either.

One aspect of the present disclosure provides an image sensor. The image sensor includes a repeating unit in a two-dimensional pixel array. The repeating unit includes a plurality of color pixels and a plurality of transparent pixels. In the repeating unit, the plurality of transparent pixels are disposed along a first diagonal line and one or more first parallel lines parallel to the first diagonal line, and the color pixels are disposed along a second diagonal line and one or more second parallel lines parallel to the second diagonal line. The first diagonal line is different from the second diagonal line.

In some embodiments, a first exposure time of at least two adjacent transparent pixels along the first diagonal line is controlled by a first exposure signal, and a second exposure time of at least two adjacent color pixels along the second diagonal line is controlled by a second exposure signal. The first exposure signal is different from the second exposure signal.

In some embodiments, the first exposure time is shorter than or equal to the second exposure time.

In some embodiments, a ratio of the first exposure time to the second exposure time is one of 1:2, 1:3 or 1:4.

In some embodiments, the image sensor further includes a first exposure-control line electrically coupled to control terminals of exposure-control circuits of at least two adjacent transparent pixel on the first diagonal line, and a second exposure-control line electrically coupled to control terminals of exposure-control circuits of at least two adjacent color pixel on the second diagonal line. The first exposure signal is transmitted by the first exposure-control line, and the second exposure signal is transmitted by the second exposure-control line.

In some embodiments, the first exposure-control line is disposed as "W" shape, and the at least two adjacent transparent pixels are disposed in adjacent two rows. In some embodiments, the second exposure-control line is disposed as "W" shape, and the at least two adjacent color pixels are disposed in adjacent two rows.

In some embodiments, each pixel further includes a photoelectric conversion element. The exposure-control circuit is electrically coupled to the photoelectric conversion element to transmit electric charges generated by the photoelectric conversion element.

In some embodiments, the exposure-control circuit includes a transmission transistor, and the control terminal of the exposure-control circuit includes a gate electrode of the transmission transistor.

In some embodiments, the repeating unit includes 16 pixels arranged in 4 rows and 4 columns as:

| W | A | W | B |
|---|---|---|---|
| A | W | B | W |
| W | B | W | C |
| B | W | C | W. |

In the above arrangement, W represents the transparent pixels, A represents first color pixels of the color pixels, B represents second color pixels of the color pixels, and C represents third color pixels of the color pixels. A, B, and C are different from one another.

In some embodiments, the repeating unit includes 16 pixels arranged in 4 rows and 4 columns as:

| A | W | B | W |
|---|---|---|---|
| W | A | W | B |
| B | W | C | W |
| W | B | W | C. |

In the above arrangement, W represents the transparent pixels, A represents first color pixels of the color pixels, B represents second color pixels of the color pixels, and C represents third color pixels of the color pixels. A, B, and C are different from one another.

In some embodiments, the repeating unit includes 36 pixels arranged in 6 rows and 6 columns as:

| W | A | W | B | W | B |
|---|---|---|---|---|---|
| A | W | A | W | B | W |
| W | A | W | B | W | B |
| B | W | B | W | C | W |
| W | B | W | C | W | C |
| B | W | B | W | C | W. |

In the above arrangement, W represents the transparent pixels, A represents first color pixels of the color pixels, B represents second color pixels of the color pixels, and C represents third color pixels of the color pixels. A, B, and C are different from one another.

In some embodiments, the repeating unit includes 36 pixels arranged in 6 rows and 6 columns as:

| A | W | A | W | B | W |
|---|---|---|---|---|---|
| W | A | W | B | W | B |
| A | W | A | W | B | W |
| W | B | W | C | W | C |
| B | W | B | W | C | W |
| W | B | W | C | W | C. |

In the above arrangement, W represents the transparent pixels, A represents first color pixels of the color pixels, B represents second color pixels of the color pixels, and C represents third color pixels of the color pixels. A, B, and C are different from one another.

In some embodiments, the color pixels include first color pixels A representing red pixels R, second color pixels B representing one of green pixels G and yellow pixels Y, and third color pixels C representing blue pixels Bu.

In some embodiments, the color pixels include first color pixels A representing magenta pixels M, second color pixels B representing cyan pixels Cy, and third color pixels C representing yellow pixels Y.

In some embodiments, a spectral response band of the transparent pixels corresponds to visible spectrum.

In some embodiments, a spectral response band of the transparent pixels corresponds to visible and near infrared spectrum and matches the response spectrum of a photodiode in the image sensor.

Another aspect of the present disclosure provides an image sensor. The image sensor includes a plurality of color pixels and a plurality of transparent pixels arranged in a matrix. The color pixels and the transparent pixels are disposed at intervals in rows and columns. A first exposure-control line electrically coupled to control terminals of exposure-control circuits of the transparent pixels in (2n−1)th and (2n)th rows, configured to control a first exposure time of transparent pixels in the (2n−1)th and (2n)th rows. A second exposure-control line electrically coupled to control terminals of exposure-control circuits of color pixels in the (2n−1)th and (2n)th rows, configured to control a second exposure time of the color pixels in the (2n−1)th and (2n)th rows. n is a natural number greater than or equal to 1.

Another aspect of the present disclosure provides an image acquisition method, which includes the following operations. An ambient illumination on an image sensor is acquired. The image sensor includes a plurality of color pixels and a plurality of transparent pixels. It is determined whether the ambient illumination is less than an illumination threshold. In response to the ambient illumination being less than an illumination threshold, a first exposure time on the plurality of transparent pixels is controlled to be shorter than a second exposure time on the plurality of color pixels. In response to the ambient illumination being greater than or equal to the illumination threshold, the first exposure time on the plurality of transparent pixels is controlled to be equal to the second exposure time on the plurality of color pixels.

Another aspect of the present disclosure provides a camera module. The camera module includes a lens configured to focus an illumination of an image onto the image sensor and the image sensor configured to convert the illumination to electric charges. The image sensor includes a plurality of color pixels and a plurality of transparent pixels arranged in a two-dimensional array. The plurality of transparent pixels are disposed along a first diagonal line and one or more first parallel lines parallel to the first diagonal line, and the color pixels are disposed along a second diagonal line and one or more second parallel lines parallel to the second diagonal line. The first diagonal line is different from the second diagonal line. The camera module further includes a circuit component configured to collect and transmit the electric charges, acquire electrical energy for the camera module, and transmit data.

Another aspect of the present disclosure provides a mobile terminal. The mobile terminal includes a camera module for sensing an image. The camera module includes a lens configured to focus an illumination of the image onto the image sensor, and the image sensor configured to convert the illumination to electric charges. The image sensor includes a plurality of color pixels and a plurality of transparent pixels arranged in a two-dimensional array. The plurality of transparent pixels are disposed along a first diagonal line and one or more first parallel lines parallel to the first diagonal line, and the color pixels are disposed along a second diagonal line and one or more second parallel lines parallel to the second diagonal line. The first diagonal line is different from the second diagonal line. The camera module also includes a circuit component configured to collect and transmit the electric charges, acquire electrical energy for the camera module, and transmit data. The mobile terminal further includes a processor, a memory, a display, and a structure component. The processor is configured to process the image acquired by the camera module. The memory is configured to store the image acquired by the camera module. The display component is configured to display the image acquired by the camera module. The structure component is configured to provide support to the camera module.

Reference herein to "embodiments" means that, in conjunction with the specific features described in the embodiments, the structure or characteristics may be included in at least one embodiment of the present application. The appearance of "embodiments" in various places in the specification does not necessarily mean the same embodiment. Those skilled in the art understand explicitly or implicitly that the embodiments described herein may be compatible with other embodiments.

The embodiments of the present disclosure will be further described below with reference to the drawings.

For a color image sensor, pixels of different colors receive different exposures per unit time. Pixels of some colors can become saturated while pixels of some other colors have not been exposed to the ideal state. For example, the ideal state means that pixels exposed to 60%-90% of saturation exposure amount can have a better signal-to-noise ratio and accuracy. However, the embodiments of the present disclosure are not limited to this.

Pixels of various colors, e.g., R (red), G (green), B (blue), and W (transparent) are employed as examples in FIG. 1 for illustrating variations of exposure amount as a function of exposure time. As shown in FIG. 1, the horizontal axis represents the exposure time, the vertical axis represents the exposure amount, and Q represents the saturation exposure amount. LW represents the exposure curve of the transparent pixel W, LG represents the exposure curve of the green pixel G, LR represents the exposure curve of the red pixel R, and LB represents the exposure curve of the blue pixel.

It can be seen in FIG. 1, the slope of the exposure curve LW of the transparent pixel W is the steepest, which means that the transparent pixel W can obtain more exposure in per unit time and reaches saturation at time t1. The slope of the exposure curve LG of the green pixel G is the second steepest, and the green pixel reaches saturation at time t2. The slope of the exposure curve LR of the red pixel R is third steepest, and the red pixel reaches saturation at time t3. The slope of the exposure curve LB of the blue pixel B is the least steep, and the blue pixel reaches saturation at time t4. At time t1, the transparent pixel W reaches saturation, but the exposures of the other three pixels R, G, B do not reach the ideal state (e.g., do not reach 60%-90% of saturation exposure amount).

In the related art, the exposure times of the RGBW pixels are jointly controlled. For example, the exposure time of each row of pixels is the same, connected to the same exposure-control line and controlled by the same exposure signal. For example, as shown in FIG. 1, during the 0-t1, all RGBW pixels can work normally, but during this period, the exposure times of RGB pixels are not sufficiently high to result in desirable (e.g., sufficiently high) signal-to-noise ratios, and the images are not desirably colorful. During the t1-t4, W pixels are overexposed due to saturation and cannot work. The exposure data of the W pixels is thus not accurate.

Based on the above reason, an aspect of the present disclosure is to provide an image sensor that can respectively control the exposure times of transparent pixels W and color pixels, reducing the exposure time limit of transparent pixels W, and balancing exposures of transparent pixels W and color pixels (including but not limited to RGB) to improve the quality of images.

It should be noted that, the exposure curves in FIG. 1 are only taken as an example. The slope and relative relationship of the curves may vary according to different spectral responses of pixels. The present application is not limited to the example shown in FIG. 1. For example, when the spectral response band of the red pixel R is narrow, the slope of the exposure curve of the red pixel R may be lower than the slope of the exposure curve of the blue pixel B.

Figure 2:
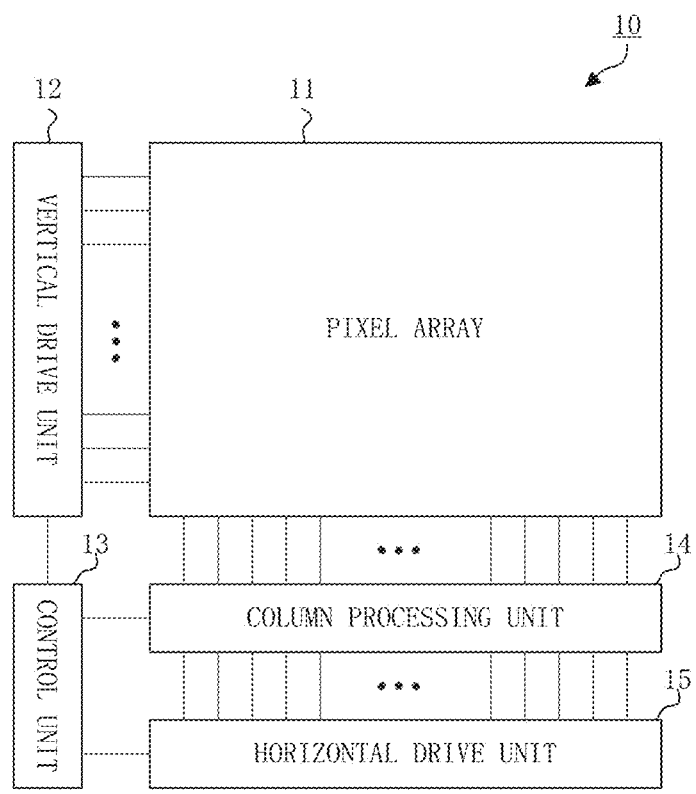
FIG. 2 is a schematic diagram of an image sensor according to an embodiment of the present disclosure.

The structure of the image sensor will be introduced as follows. Referring to FIG. 2, FIG. 2 is a schematic diagram of an image sensor 10 according to an embodiment of the present disclosure. The image sensor 10 includes a pixel array 11, a vertical drive unit 12, a control unit 13, a column processing unit 14, and a horizontal drive unit 15.

In various embodiments, image sensor 10 can be CMOS (Complementary Metal Oxide Semiconductor) or CCD (Charge-coupled Device).

For example, pixel array 11 may include pixels disposed in a two-dimensional array (not shown in FIG. 2). Each pixel may include a photoelectric conversion element. A pixel may convert light incident on the pixel into electric charges.

Vertical drive unit 12 may include a shift register and an address decoder. Vertical drive unit 12 may perform readout scans and reset scan functions. The readout scan refers to sequentially scanning and readout signals from pixels row by row. For example, a signal output from each of the pixels in the pixel row selected and scanned can be transmitted to column processing unit 14. The signal may correspond to a signal level of charges. The reset scan is used to reset the charges in each pixel. The charges (e.g., signal level) generated by the photoelectric conversion element can be discarded before new charge accumulation starts. The reset scan may thus cause each pixel to have a reset level (e.g., of charges) before new charges start to accumulate.

Signal processing performed by column processing unit 14 may include a correlated double sampling (CDS) process. In the CDS process, the reset level and the signal level outputted from each of the pixels in a selected row can be retrieved, and the difference between the reset and signal levels of each pixel can be computed. Thus, the signals of the pixels in the row are obtained. Column processing unit 14 may have an analog-to-digital (A/D) conversion function for converting an analog pixel signal into a digital format.

Horizontal drive unit 15 may include a shift register and an address decoder. Horizontal drive unit 15 may sequentially scan the pixel array column by column Each of the pixel columns is sequentially processed by column processing unit 14 through the selection scanning operation performed by horizontal drive unit 15. The scanning may sequentially output signals into column processing unit 14.

Control unit 13 may configure timing signals according to the operation mode, and use a variety of timing signals to control vertical drive unit 12, column processing unit 14, and horizontal drive unit 15 to work in cooperation.

Figure 3A:
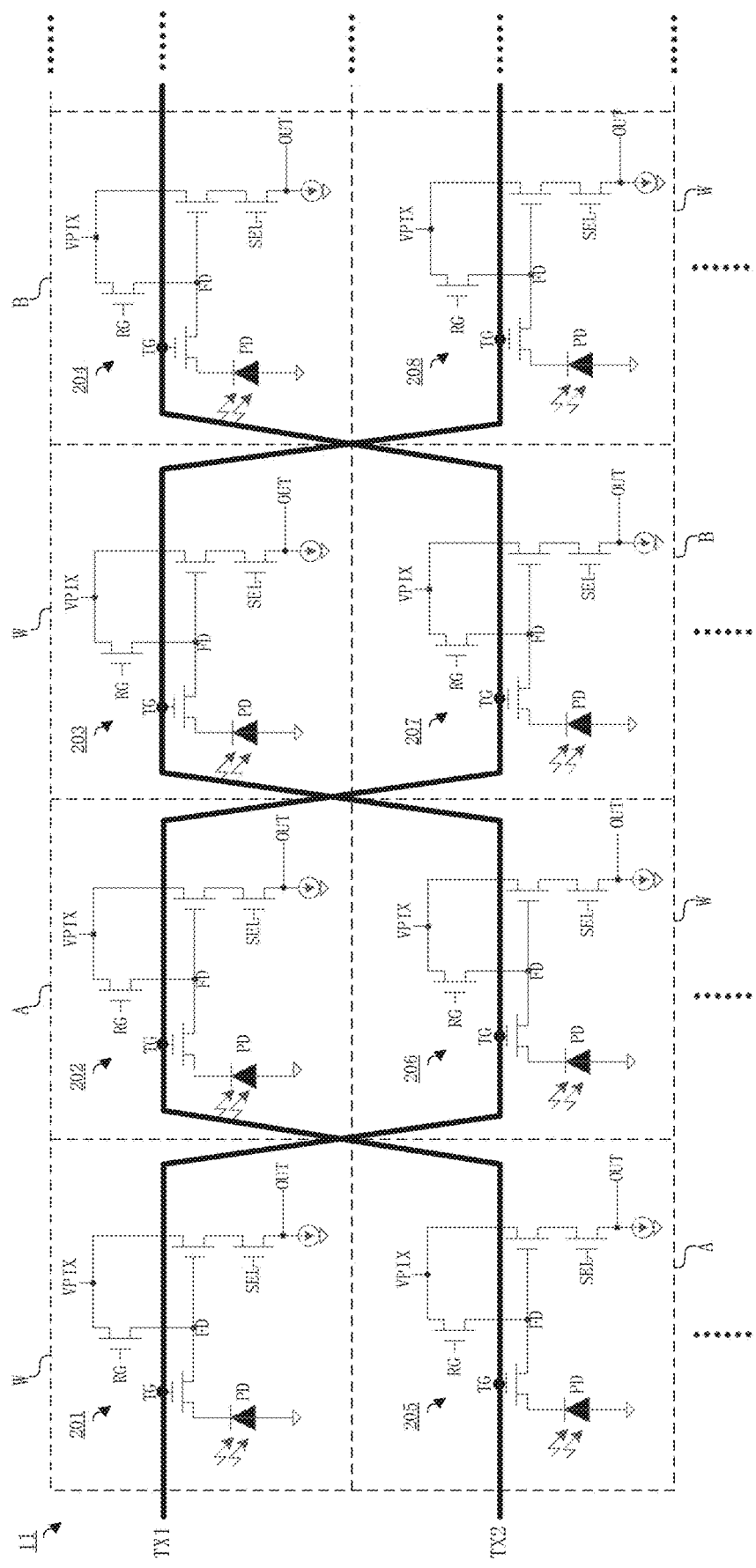
FIG. 3A is a schematic diagram of a pixel array and a connection of exposure-control lines according to an embodiment of the present disclosure.

FIG. 3A is a schematic diagram of a pixel array and a connection of exposure-control lines according to an embodiment of the present disclosure. As shown in FIG. 3A, a pixel array 11 is illustrated as an example for description. In pixel array 11, the pixels are arranged as follows.

| W | A | W | B  |
|---|---|---|----|
| A | W | B | W. |

It should be noted that, for the convenience of illustration, only some pixels in the pixel array 11 are shown in FIG. 3A, and other surrounding pixels and wires are not shown and replaced with ellipses " . . . ".

As shown in FIG. 3A, pixels 201, 203, 206, and 208 represent the transparent pixels W, pixels 202 and 205 represent the first color pixels A (e.g., red pixels R), and pixels 204 and 207 represent the second color pixels B (e.g., green pixel G). It can be seen in FIG. 3A, a control terminals TG of exposure-control circuits of the transparent pixels W (pixels 201, 203, 206, and 208) are electrically coupled to (e.g., electrically connected to) a first exposure-control line TX1. The control terminals TG of exposure-control circuits of the first color pixels A (pixels 202 and 205) and the second color pixels B (pixels 204 and 207) are electrically coupled to a second exposure-control line TX2.

The exposure times of the transparent pixels can be controlled by the first exposure signal transmitted by the first exposure-control line TX1, and the exposure times of the color pixels (e.g., first color pixels A and second color pixels B) can be controlled by the second exposure signal transmitted by the second exposure-control line TX2. Thus, the exposure times of the transparent pixels and the color pixels can be respectively controlled. For example, when the exposure of transparent pixels stops, the color pixels may continue to undergo exposure to achieve the desired imaging effect.

It should be noted that the terms "first," "second," etc. here and in the context are for descriptive purposes only and cannot be understood as indicating or implying relative importance or implicitly indicating the number of indicated technical features. Thus, features defined as "first" and "second" may explicitly or implicitly include one or more of the features.

For example, as shown in FIG. 2 and FIG. 3A, the first exposure-control line TX1 and the second exposure-control line TX2 are electrically coupled to vertical drive unit 12 (shown in FIG. 2), and transmit the corresponding exposure control signals in vertical drive unit 12 to the control terminals TG of the exposure control circuits of pixels in pixel array 11.

It can be understood that, since there are multiple rows in the pixel array, the vertical drive unit 12 can be electrically coupled to multiple first exposure-control lines TX1 and multiple second exposure-control lines TX2. The multiple first exposure-control lines TX1 and multiple second exposure-control lines TX2 may each correspond to respective pixel row groups.

For example, the first exposure-control line TX1 corresponds to the transparent pixels in the first row and second row; the second first exposure-control line TX1 corresponds to the transparent pixels in the third row and fourth row; and so on. The timing signals transmitted by different first exposure-control lines TX1 can be different, and the timing signals may be configured by the vertical drive unit 12.

For example, the first second exposure-control line TX2 corresponds to the color pixels in the first row and second row; the second second exposure-control line TX2 corresponds to the color pixels in the third row and fourth row; and so on. The timing signals transmitted by different second exposure-control lines TX2 can be different, and the timing signals may be configured by the vertical drive unit 12.

Figure 3B:
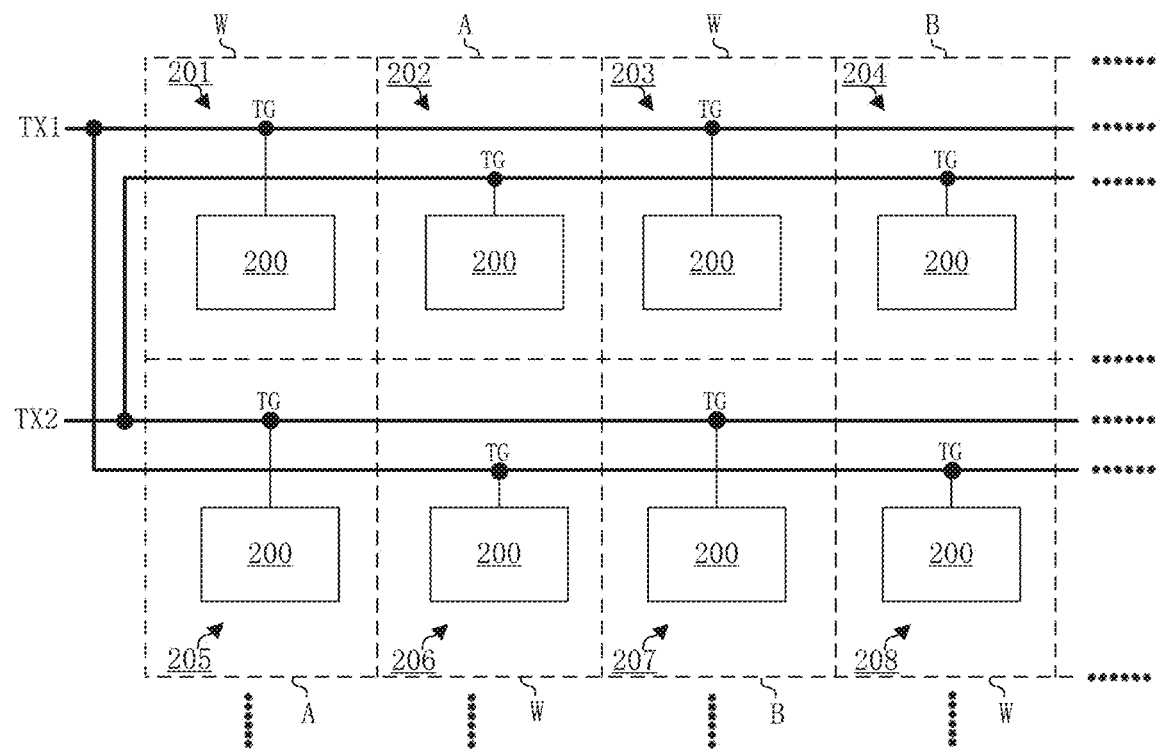
FIG. 3B is another schematic diagram of a pixel array and a connection of exposure-control lines according to an embodiment of the present disclosure.

For example, as shown in FIG. 3B, pixels 201, 203, 206 and 208 represent the transparent pixels W, pixels 202 and 205 represent the first color pixels A (e.g., red pixels R), and pixels 204 and 207 are the second color pixels B (e.g., green pixel G). It can be seen in FIG. 3B, the control terminals TG of exposure-control circuits of the transparent pixels W (pixels 201, 203, 206, and 208) are connected to the first exposure-control line TX1. The control terminals TG of exposure-control circuits of the first color pixels A (pixels 202 and 205) and the second color pixels B (pixels 204 and 207) are connected to the second exposure-control line TX2. The exposure time of the transparent pixels can be controlled by the first exposure signal transmitted by the first exposure-control line TX1, and the exposure time of the color pixels (e.g., the first color pixels A and the second color pixels B) can be controlled by the second exposure signal transmitted by the second exposure-control line TX2. Thus, the exposure times of the transparent pixels and the color pixels can be respectively controlled. For example, when the exposure of transparent pixels stops, the color pixels may continue to undergo exposure to achieve the desired imaging effect. Different from FIG. 3A, in the embodiments shown in FIG. 3B, the first exposure-control lines TX1 and the second exposure-control lines TX2 are wired according to the row direction, that is, the first exposure-control lines TX1 and the second exposure-control lines TX2 are provided in each row of pixels respectively. The first exposure-control lines TX1 may be electrically coupled to transparent pixels W in two adjacent rows, and electrically coupled to the vertical drive unit 12. The second exposure-control lines TX2 may be electrically coupled to color pixels in two adjacent rows, and electrically coupled to the vertical drive unit 12. In this embodiment, the wiring of the first exposure-control lines TX1 and the second exposure-control lines TX2 may follow a regular and simple pattern. The first exposure-control lines TX1 and the second exposure-control lines TX2 may have fewer intersections in the pixel area, which helps improve yield and reduce costs. In FIG. 3B, pixel circuits 200 may be disposed in pixels.

Figure 4:
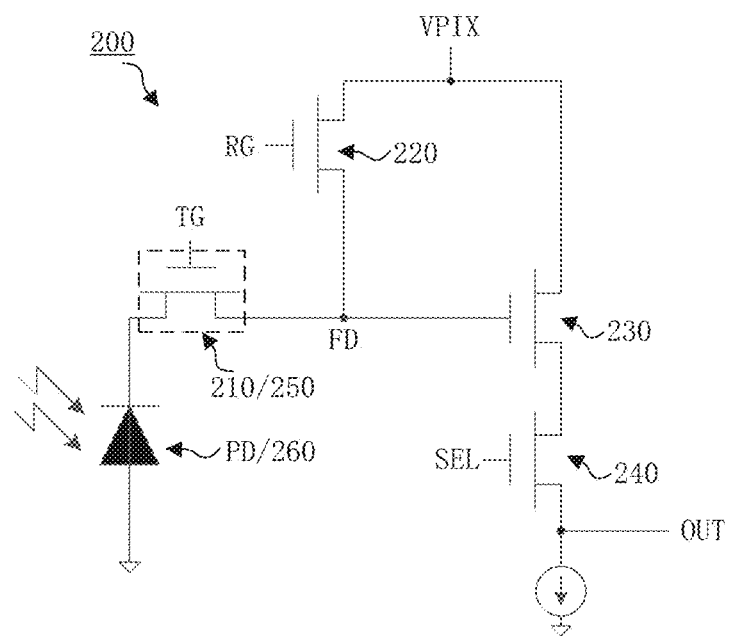
FIG. 4 is a schematic diagram of a pixel circuit according to an embodiment of the present disclosure.

For example, FIG. 4 is a schematic diagram of a pixel circuit 200 according to an embodiment of the present disclosure. Pixel circuit 200 in FIG. 4 is applied to each pixel in FIG. 3A and FIG. 3B. The working principle of the pixel circuit 200 will be described with reference to FIG. 3A and FIG. 4.

As shown in FIG. 4, pixel circuit 200 may include a photoelectric conversion element 260 (e.g., a photodiode PD), an exposure-control circuit 250 (e.g., a transmission transistor 210), a reset circuit (e.g., a reset transistor 220), an amplifying circuit (e.g., an amplifying transistor 230) and a select circuit (e.g., a select transistor 240). In some embodiments of the present disclosure, transmission transistor 210, reset transistor 220, amplifying transistor 230, and select transistor 240 include but not limited to, for example, MOS transistors.

As shown in FIG. 2, FIG. 3A and FIG. 4, the gate electrode TG of the transmission transistor 210 may be electrically coupled to the vertical drive unit 12 through the exposure-control line. The gate electrode RG of reset transistor 220 may be electrically coupled to the vertical drive unit 12 through the reset-control line (not shown in the figures). The gate electrode SEL of select transistor 240 may be electrically coupled to vertical drive unit 12 through the select line (not shown in the figures). Each pixel circuit may further include photoelectric conversion element 260, and exposure-control circuit 250 may be electrically coupled to photoelectric conversion element 260 for transmitting the charges accumulated by photoelectric conversion element 260 after being illuminated. For example, photoelectric conversion element 260 may include a photodiode PD, and the anode of the photodiode PD may be electrically coupled to ground. The photodiode PD converts light into charges. The cathode of the photodiode PD may be electrically coupled to the floating diffusion unit FD through the exposure-control circuit 250 (for example, transmission transistor 210). The floating diffusion unit FD may be electrically coupled to the gate electrode of amplifying transistor 230 and the source of reset transistor 220.

Exposure-control circuit 250 may include transmission transistor 210, and the control terminal of the exposure-control circuit may be the gate electrode of transmission transistor 210. When a pulse of an effective voltage (for example, pixel power supply VPIX) is transmitted to the gate electrode of the transmission transistor 210 through an exposure-control line (for example, TX1 or TX2), transmission transistor 210 may be turned on. Transmission transistor 210 may transmit the charges generated by the photodiode PD to the floating diffusion unit FD.

The drain electrode of reset transistor 220 may be electrically coupled to the pixel power supply VPIX. The source electrode of reset transistor 220 may be electrically coupled to the floating diffusion unit FD. Before the signal charges are transmitted from the photodiode PD to the floating diffusion unit FD, a pulse of a reset voltage may be transmitted to the gate electrode of reset transistor 220 through the reset line, and thus reset transistor 220 may be turned on. Reset transistor 220 may reset the floating diffusion unit FD to the voltage of the pixel power supply VPIX.

The gate electrode of amplifying transistor 230 may be electrically coupled to the floating diffusion unit FD. The drain electrode of amplifying transistor 230 may be electrically coupled to the pixel power supply VPIX. After the floating diffusion unit FD is reset by reset transistor 220, amplifying transistor 230 may output the reset voltage through the output terminal OUT via selection transistor 240. After the signal charges of the photodiode PD is transmitted by transmission transistor 210, amplifying transistor 230 may output the signal level through the output terminal OUT via select transistor 240.

The drain electrode of the selection transistor 240 may be electrically coupled to the source electrode of amplifying transistor 230. The source electrode of select transistor 240 may be electrically coupled to column processing unit 14 (shown in FIG. 2) through the output terminal OUT. When a pulse of an effective voltage is transmitted to the gate electrode of select transistor 240 through the select line, select transistor 240 may be turned on. The signal output from amplifying transistor 230 may be transmitted to column processing unit 14 through selection transistor 240.

It should be noted that the pixel structure of pixel circuit 200 in the embodiments of the present disclosure is not limited to the structure shown in FIG. 4. For example, the pixel circuit 200 may have a three-transistor pixel structure, in which the functions of amplifying transistor 230 and select transistor 240 can be realized by one transistor. In another example, exposure control circuit 250 is also not limited to transmission transistor 210, and other electronic devices or structures with conduction control function can be used as the exposure control circuit in the embodiments of the present application. The implementation of the single transmission transistor 210 as the exposure control circuit 250 is simple, low cost, easy to control, and can save the area occupied by the circuit.

Figure 5:
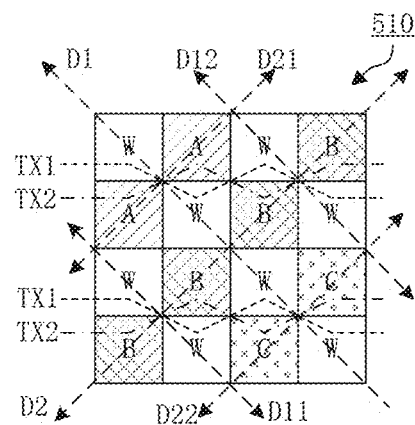
FIG. 5 is a schematic diagram of an arrangement of pixels in a repeating unit according to an embodiment of the present disclosure.

For example, FIGS. 5-20 show examples of pixel arrangements in image sensors. As shown in FIGS. 5-20, an image sensor 10 may include a two-dimensional pixel array having color pixels (e.g., first color pixels A, second color pixels B and third color pixels C) and transparent pixels W. For example, the spectral response band of any one of the color pixels is narrower than that of the transparent pixels W. For example, the spectral response band of a color pixel can be part of the spectral response band of the transparent pixel W. The two-dimensional pixel array may include one or more repeating units (Examples of a repeating unit of the image sensor 10 is shown in each one of FIGS. 5-20). As shown in FIG. 5, in the repeating unit, transparent pixels W may be disposed along a first diagonal line D1 and first parallel lines D11 and D12, and the color pixels are disposed along a second diagonal line D2 and second parallel lines D21 and D22. First diagonal line D1 may be different from the second diagonal line D2. First parallel lines D11 and D12 may each be parallel to the first diagonal line D1, and second parallel lines D21 and D22 may each be parallel to the second diagonal line D2. The first exposure time of at least two adjacent transparent pixels along the first diagonal line D1 may be controlled by a first exposure signal, and the second exposure time of at least two adjacent color pixels along the second diagonal line D2 may be controlled by a second exposure signal. The first exposure time of the transparent pixels and the second exposure time of the color pixels may be respectively controlled.

In an example, the number of pixels in the row and column of the repeating unit is equal. For example, the minimum arrangement unit may include, but is not limited to, a minimum arrangement unit of 4 rows and 4 columns, 6 rows and 6 columns, 8 rows and 8 columns, and 10 rows and 10 columns. These embodiments help balance the resolution and color performance of the image in the row and column directions, and thus improve the display effect.

It should be noted that the wiring form shown in FIG. 3A is taken as an example for illustration in FIGS. 5-20. The embodiments of the present disclosure include but are not limited to the wiring form shown in FIG. 3A and may also be other wiring forms such as the wiring form shown in FIG. 3B.

For example, FIG. 5 is the schematic diagram of an arrangement of pixels in a repeating unit 510 according to the embodiment of the present disclosure. Repeating unit 510 may include 16 pixels arranged in 4 rows and 4 columns as follows:

| | | | |
|---|---|---|---|
| W | A | W | B |
| A | W | B | W |
| W | B | W | C |
| B | W | C | W. |

In some embodiments, W represents the transparent pixel, A represents the first color pixel of the color pixels, B represents the second color pixel of the color pixels, and C represents the third color pixel of the color pixels.

For example, as shown in FIG. 5, the transparent pixels W are disposed along first diagonal line D1 (the diagonal line connecting the upper left corner and the lower right corner in FIG. 5) and first parallel lines D11 and D12. The color pixels are disposed along second diagonal line D2 (the diagonal line connecting the upper right corner and the lower left corner in FIG. 5) and second parallel lines D21 and D22. First diagonal line D1 is different from second diagonal line D2. For example, first diagonal line D1 may be perpendicular to the second diagonal line D2. The first exposure time of at least two adjacent transparent pixels (e.g., the pixel in the first row and first column and the pixel in the second row and second column from the upper left) along first diagonal line D1 may be controlled by the first exposure signal. The second exposure time of at least two adjacent color pixels (e.g., the color pixel B in the fourth row and first column and the color pixel B in the third row and second column from the upper left) along second diagonal line D2 may be controlled by the second exposure signal. For example, the transparent pixels W may be disposed along first parallel line (D11 and/or D12) parallel to first diagonal line D1. The first exposure time of at least two adjacent transparent pixels W (e.g., the transparent pixel on D11 in the third row and first column and the transparent pixel on D11 in the fourth row and second column from the upper left; and the transparent pixel along D12 in the first row and third column and the transparent pixel along D12 in the second row and fourth column from the upper left) on the first parallel line (D11 and/or D12) parallel to first diagonal line D1 may be controlled by the first exposure signal. For example, the color pixels may be disposed along the second parallel line (D21 and/or D22) parallel to the second diagonal line D2. The second exposure time of at least two adjacent color pixels (e.g., the color pixel A along D21 in the second row and first column and the color pixel A on D21 in the first row and second column from the upper left; and the color pixel C along D22 in the fourth row and third column and the color pixel C along D22 in the third row and fourth column from the upper left) on second parallel line (D21 and/or D22) parallel to second diagonal line D2 may be controlled by the second exposure signal.

It should be understood that the orientation or positional relationship indicated by the terms "upper," "lower," "left," and "right" here and below is based on the orientation or positional relationship shown in the drawings. It is only for the convenience of describing the embodiments and simplifying the description, rather than indicating or implying that the device or element referred to must have a specific orientation and be constructed and operated in a specific orientation.

For example, as shown in FIG. 5, the transparent pixels in the first row and the second row are coupled to one another (e.g., connected) by the first exposure-control line TX1 in a "W" shape to control the exposure time of the transparent pixels independently. The color pixels (A and B) in the first row and the second row are connected by the second exposure-control line TX2 in a "W" shape to control the exposure time of the color pixels independently. For example, the first exposure signal may be transmitted by the first exposure-control line TX1, and the second exposure signal may be transmitted by the second exposure-control line TX2. The first exposure-control line TX1 may be disposed as "W" shape, and may be electrically coupled to control terminals of exposure-control circuits of transparent pixels in adjacent two rows. The second exposure-control line TX2 may be disposed as "W" shape, and may be electrically coupled to control terminals of exposure-control circuits of color pixels in adjacent two rows. For the specific connection, please refer to the description of the connection and pixel circuits in the relevant parts of FIG. 3A and FIG. 4 above.

It should be noted that the first exposure-control line TX1 and the second exposure-control line TX2 each being disposed as "W" shape does not mean that the physical wiring must be set strictly in accordance with the "W" shape. The connection corresponds to the arrangement of transparent pixels and color pixels. For example, the arrangement is simple to route and is good for the resolution and color effects. The respective control of exposure time of transparent pixels and exposure time of color pixels can be realized at low cost.

Figure 6:
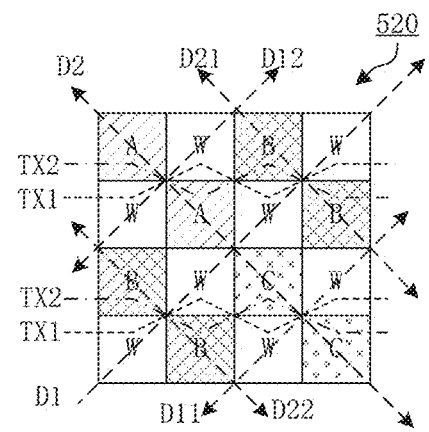
FIG. 6 is another schematic diagram of an arrangement of pixels in a repeating unit according to an embodiment of the present disclosure.

FIG. 6 is the schematic diagram of another arrangement of pixels in a repeating unit 520 according to the embodiment of the present disclosure. Repeating unit may include 16 pixels arranged in 4 rows and 4 columns as follows.

| A | W | B | W |
| W | A | W | B |
| B | W | C | W |
| W | B | W | C. |

In some embodiments, W represents the transparent pixel, A represents the first color pixel of the color pixels, B represents the second color pixel of the color pixels, and C represents the third color pixel of the color pixels.

For example, as shown in FIG. 6, the transparent pixels W may be disposed along first diagonal line D1 (the diagonal line connecting the upper right corner and the lower left corner in FIG. 6) and first parallel lines D11 and D12. The color pixels are disposed along second diagonal line D2 (the diagonal line connecting the upper left corner and the lower right corner in FIG. 6) and second parallel lines D21 and D22. For example, the first diagonal line may be perpendicular to the second diagonal line. The first exposure time of at least two adjacent transparent pixels (e.g., the transparent pixel in the first row and second column and the transparent pixel in the second row and first column from the upper left) along first diagonal line D1 may be controlled by the first exposure signal. The second exposure time of at least two adjacent color pixels (e.g., the color pixel A in the first row and first column and the color pixel A in the second row and second column from the upper left) along second diagonal line D2 may be controlled by the second exposure signal. For example, the transparent pixels W may be disposed along first parallel line (D11 and/or D12) parallel to first diagonal line D1. The first exposure time of at least two adjacent transparent pixels W along first parallel line (D11 and/or D12) parallel to first diagonal line D1 may be controlled by the first exposure signal. For example, the color pixels are disposed along the second parallel line (D21 and/or D22) parallel to second diagonal line D2. The second exposure time of at least two adjacent color pixels on the second parallel line (D21 or D22) parallel to second diagonal line D2 may be controlled by the second exposure signal.

For example, as shown in FIG. 6, the transparent pixels in the first row and the second row may be coupled to one another by the first exposure-control line TX1 in a "W" shape to control the exposure time of the transparent pixels independently. The color pixels (A and B) in the first row and the second row may be coupled to one another by the second exposure-control line TX2 in a "W" shape to control the exposure time of the color pixels independently.

Figure 7:
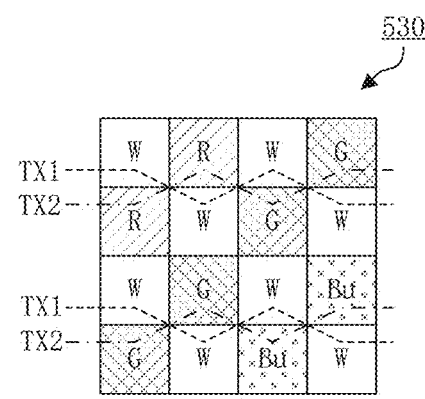
FIG. 7 is another schematic diagram of an arrangement of pixels in a repeating unit according to an embodiment of the present disclosure.
Figure 8:
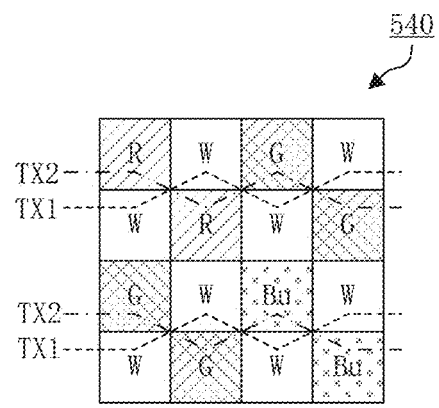
FIG. 8 is another schematic diagram of an arrangement of pixels in a repeating unit according to an embodiment of the present disclosure.

FIG. 7 is another schematic diagram of an arrangement of pixels in a repeating unit 530 according to an embodiment of the present disclosure. FIG. 8 is another schematic diagram of an arrangement of pixels in a repeating unit 540 according to an embodiment of the present disclosure. The embodiments shown in FIG. 7 and FIG. 8 correspond to the arrangements in FIG. 5 and FIG. 6. In FIGS. 7 and 8, the first color pixel A represents the red pixel R, the second color pixel B represents the green pixel G, and the third color pixel C represents the blue pixel Bu.

It should be noted that, in some embodiments, the spectral response band of the transparent pixel corresponds to visible spectrum (e.g., 400 nm-760 nm). For example, an infrared filter may be employed on a transparent pixel W to filter out infrared light. In some embodiments, the spectral response band of the transparent pixel corresponds to visible and near infrared spectrum (e.g., 400 nm-1000 nm), and matches the response spectrum of a photodiode (PD) in the image sensor. For example, the transparent pixel W may not be provided with a filter (e.g., an infrared filter), and the spectral response band of the transparent pixel W is determined by the photodiode, and thus the spectral response band of the transparent pixel W matches the response spectrum of a photodiode (PD). The embodiments of the present disclosure include but are not limited to the above spectrum.

Figure 9:
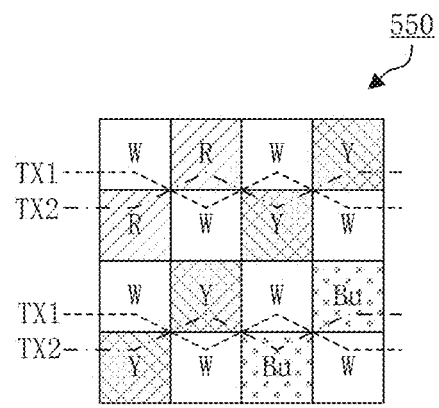
FIG. 9 is another schematic diagram of an arrangement of pixels in a repeating unit according to an embodiment of the present disclosure.
Figure 10:
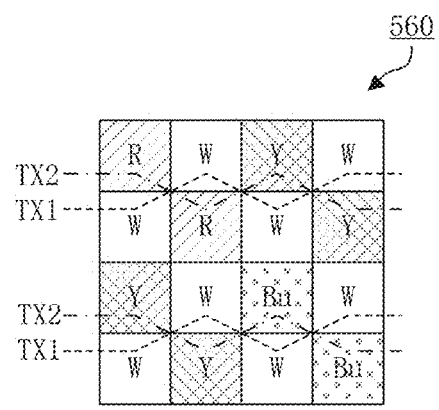
FIG. 10 is another schematic diagram of an arrangement of pixels in a repeating unit according to an embodiment of the present disclosure.

FIG. 9 is another schematic diagram of an arrangement of pixels in a repeating unit 550 according to an embodiment of the present disclosure. FIG. 10 is another schematic diagram of an arrangement of pixels in a repeating unit 560 according to an embodiment of the present disclosure. The embodiments shown in FIG. 9 and FIG. 10 correspond to the arrangements in FIG. 5 and FIG. 6. In FIGS. 9 and 10, the first color pixel A represents the red pixel R, the second color pixel B represents the yellow pixel Y, and the third color pixel C represents the blue pixel Bu.

Figure 11:
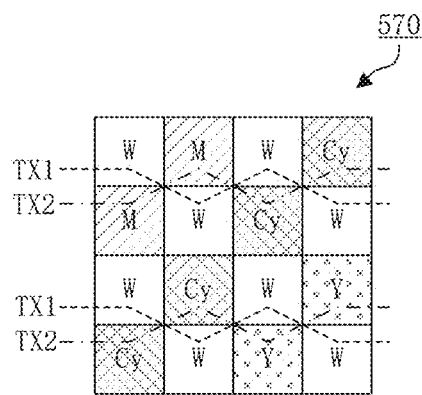
FIG. 11 is another schematic diagram of an arrangement of pixels in a repeating unit according to an embodiment of the present disclosure.
Figure 12:
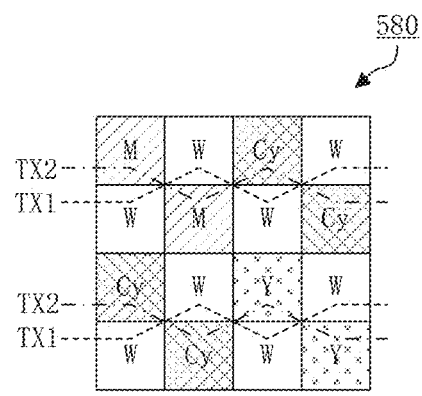
FIG. 12 is another schematic diagram of an arrangement of pixels in a repeating unit according to an embodiment of the present disclosure.

For example, FIG. 11 is another schematic diagram of an arrangement of pixels in a repeating unit 570 according to an embodiment of the present disclosure. FIG. 12 is another schematic diagram of an arrangement of pixels in a repeating unit 580 according to an embodiment of the present disclosure. The embodiments shown in FIG. 11 and FIG. 12 correspond to the arrangements in FIG. 5 and FIG. 6. In FIGS. 11 and 12, the first color pixel A represents the magenta pixel M, the second color pixel B represents the cyan pixel Cy, and the third color pixel C represents the yellow pixel Y.

For example, the minimum arrangement units shown in FIGS. 5-12 are 4 rows and 4 columns, when pixels are imaged individually or binning, better image clarity can be realized. The control logic can be desirably simple and easy to use. For example, under binning mode, taking the four pixels in the upper left corner as an example, the signals of two first color pixels A are combined into one pixel signal, and the signals of two transparent pixels W are combined into one pixel signal. In the dark environment, or when a high image quality is required, binning mode can be used. Continuing the above example, since the two first color pixels A for binning are controlled by the same first exposure-control line TX1, and the two transparent pixels W are controlled by the same second exposure-control line TX2, the control accuracy and consistency can be improved, improving image quality.

Figure 13:
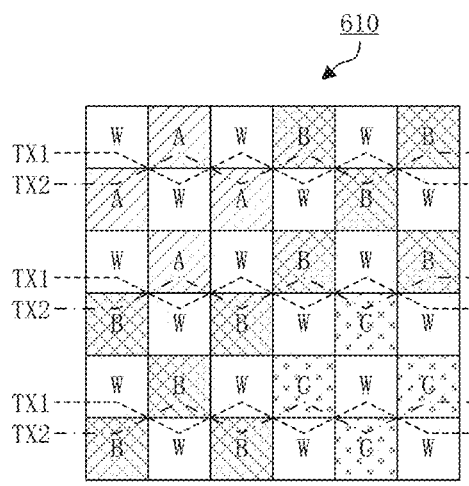
FIG. 13 is another schematic diagram of an arrangement of pixels in a repeating unit according to an embodiment of the present disclosure.

FIG. 13 is the schematic diagram of another arrangement of pixels in a repeating unit 610 according to the embodiment of the present disclosure. Repeating unit 610 may include 36 pixels arranged in 6 rows and 6 columns as follows:

| W | A | W | B | W | B |
|---|---|---|---|---|---|
| A | W | A | W | B | W |
| W | A | W | B | W | B |
| B | W | B | W | C | W |
| W | B | W | C | W | C |
| B | W | B | W | C | W. |

In some embodiments, W represents the transparent pixel, A represents the first color pixel of the color pixels, B represents the second color pixel of the color pixels, and C represents the third color pixel of the color pixels.

For example, as shown in FIG. 13, the transparent pixels in the first row and the second row may be electrically coupled by the first exposure-control line TX1 in a "W" shape to control the exposure time of the transparent pixels independently. The color pixels (A and B) in the first row and the second row may be electrically coupled by the second exposure-control line TX2 in a "W" shape to control the exposure time of the color pixels independently.

Figure 14:
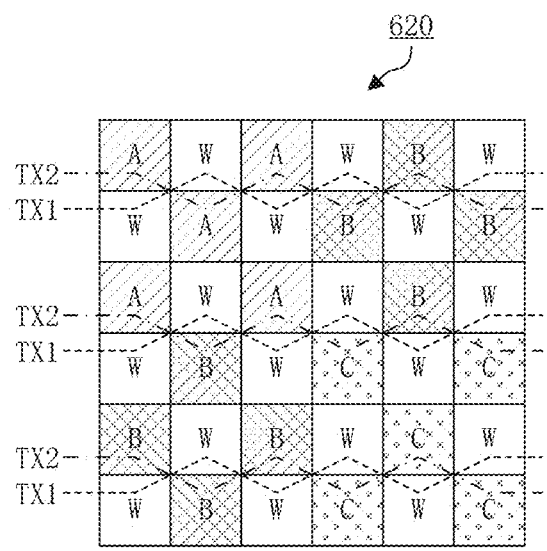
FIG. 14 is another schematic diagram of an arrangement of pixels in a repeating unit according to an embodiment of the present disclosure.

FIG. 14 is the schematic diagram of another arrangement of pixels in a repeating unit 620 according to the embodiment of the present disclosure. Repeating unit 620 may include 36 pixels arranged in 6 rows and 6 columns as follows:

| A | W | A | W | B | W |
|---|---|---|---|---|---|
| W | A | W | B | W | B |
| A | W | A | W | B | W |
| W | B | W | C | W | C |
| B | W | B | W | C | W |
| W | B | W | C | W | C. |

In some embodiments, W represents the transparent pixel, A represents the first color pixel of the color pixels, B represents the second color pixel of the color pixels, and C represents the third color pixel of the color pixels.

For example, as shown in FIG. 14, the transparent pixels in the first row and the second row may be electrically coupled to one another by the first exposure-control line TX1 in a "W" shape to control the exposure time of the transparent pixels independently. The color pixels (A and B) in the first row and the second row may be electrically coupled to one another by the second exposure-control line TX2 in a "W" shape to control the exposure time of the color pixels independently.

Figure 15:
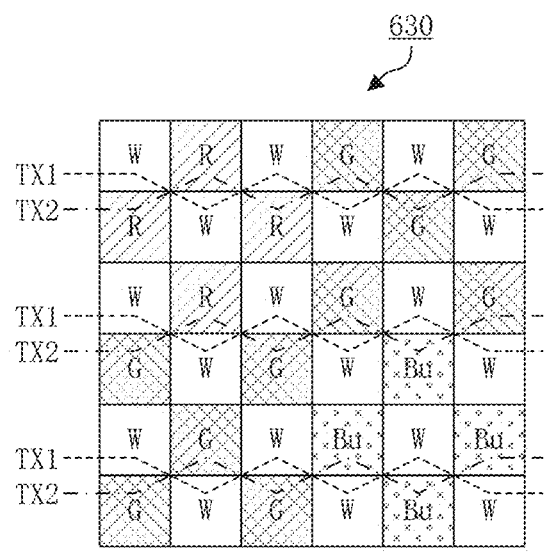
FIG. 15 is another schematic diagram of an arrangement of pixels in a repeating unit according to an embodiment of the present disclosure.
Figure 16:
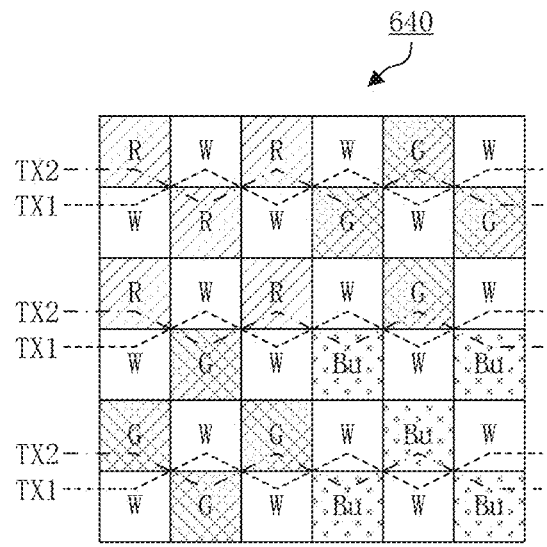
FIG. 16 is another schematic diagram of an arrangement of pixels in a repeating unit according to an embodiment of the present disclosure.

For example, FIG. 15 is another schematic diagram of an arrangement of pixels in a repeating unit 630 according to an embodiment of the present disclosure. FIG. 16 is another schematic diagram of an arrangement of pixels in a repeating unit 640 according to an embodiment of the present disclosure. The embodiments shown in FIG. 15 and FIG. 16 correspond to the arrangements in FIG. 13 and FIG. 14. In FIGS. 15 and 16, the first color pixel A is the red pixel R, the second color pixel B is the green pixel G, and the third color pixel C is the blue pixel Bu.

For example, in some embodiments, the first color pixel A is the red pixel R, the second color pixel B is the yellow pixel Y, and the third color pixel C is the blue pixel Bu. In another example, the first color pixel A is the magenta pixel M, the second color pixel B is the cyan pixel Cy, and the third color pixel C is the yellow pixel Y. Embodiments of the present disclosure include but are not limited to this. For the specific connection of the circuit, please refer to the above description, which will not be repeated here.

Figure 17:
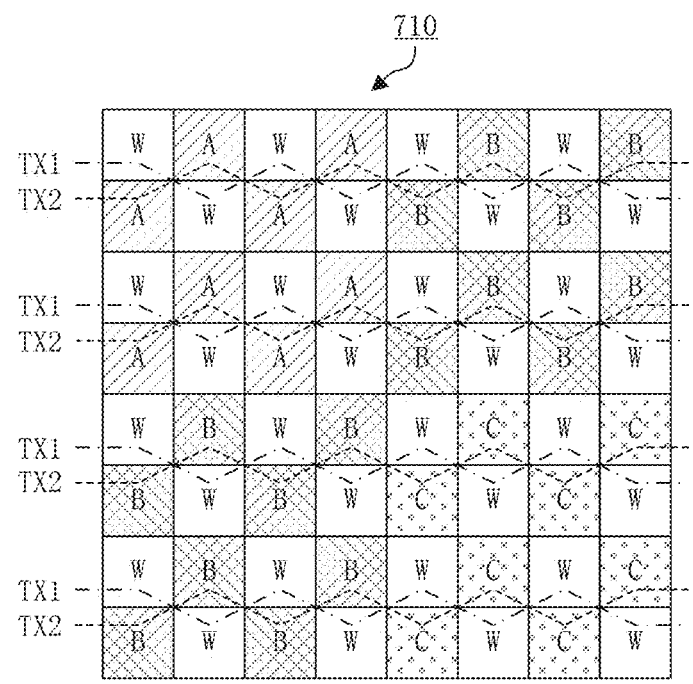
FIG. 17 is another schematic diagram of an arrangement of pixels in a repeating unit according to an embodiment of the present disclosure.

FIG. 17 is the schematic diagram of another arrangement of pixels in a repeating unit 710 according to the embodiment of the present disclosure. Repeating unit 710 may include 64 pixels arranged in 8 rows and 8 columns as follows:

| W | A | W | A | W | B | W | B |
|---|---|---|---|---|---|---|---|
| A | W | A | W | B | W | B | W |
| W | A | W | A | W | B | W | B |
| A | W | A | W | B | W | B | W |
| W | B | W | B | W | C | W | C |
| B | W | B | W | C | W | C | W |
| W | B | W | B | W | C | W | C |
| B | W | B | W | C | W | C | W. |

In some embodiments, W represents the transparent pixel, A represents the first color pixel of the color pixels, B represents the second color pixel of the color pixels, and C represents the third color pixel of the color pixels.

For example, as shown in FIG. 17, the transparent pixels in the first row and the second row may be electrically coupled to one another by the first exposure-control line TX1 in a "W" shape to control the exposure time of the transparent pixels independently. The color pixels (A and B) in the first row and the second row may be electrically coupled to one another by the second exposure-control line TX2 in a "W" shape to control the exposure time of the color pixels independently.

Figures 18, 19:
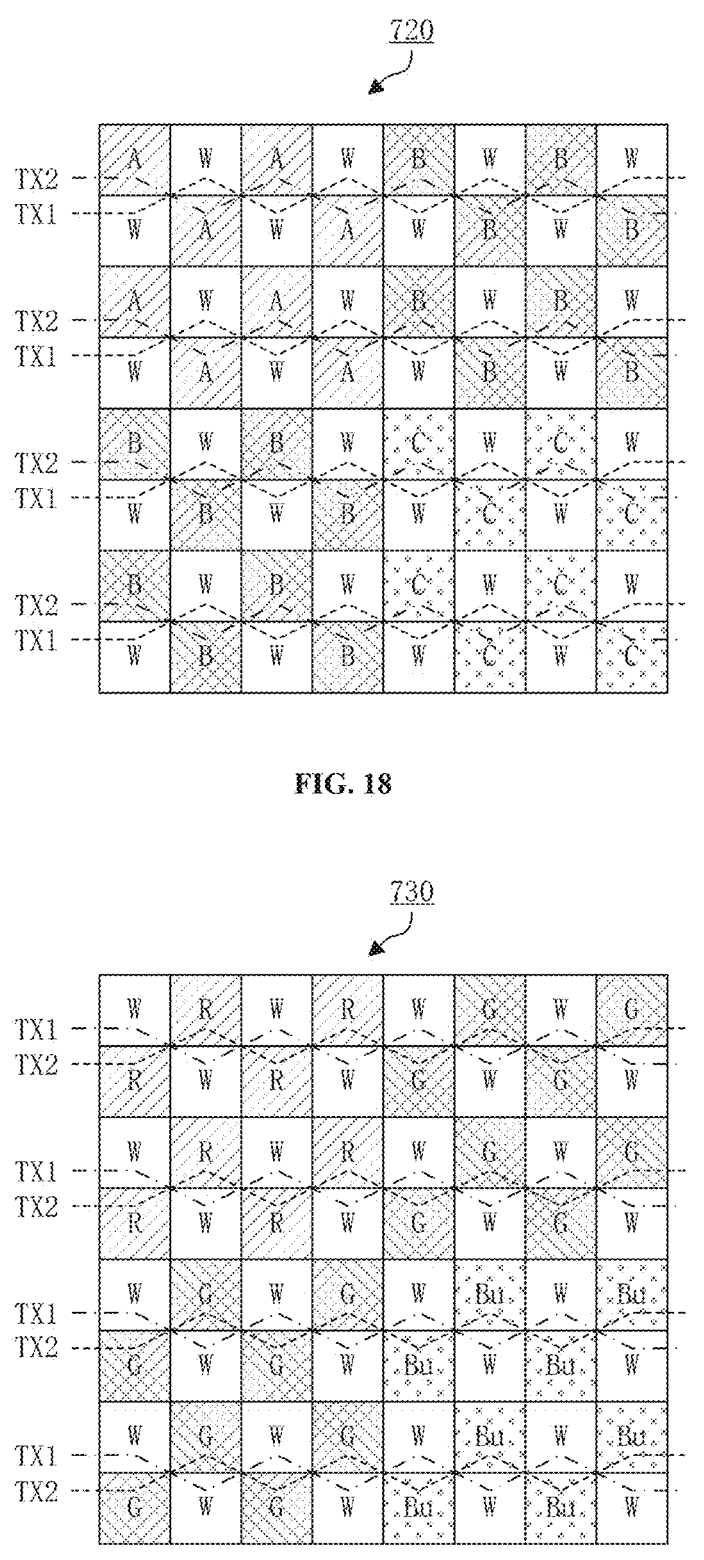

For example, FIG. 18 is the schematic diagram of another arrangement of pixels in a repeating unit 720 according to the embodiment of the present disclosure. Repeating unit may include 64 pixels arranged in 8 rows and 8 columns as follows:

| A | W | A | W | B | W | B | W |
|---|---|---|---|---|---|---|---|
| W | A | W | A | W | B | W | B |
| A | W | A | W | B | W | B | W |
| W | A | W | A | W | B | W | B |
| B | W | B | W | C | W | C | W |
| W | B | W | B | W | C | W | C |
| B | W | B | W | C | W | C | W |
| W | B | W | B | W | C | W | C. |

In some embodiments, W represents the transparent pixel, A represents the first color pixel of the color pixels, B represents the second color pixel of the color pixels, and C represents the third color pixel of the color pixels.

For example, as shown in FIG. 18, the transparent pixels in the first row and the second row are may be electrically coupled to one another by the first exposure-control line TX1 in a "W" shape to control the exposure time of the transparent pixels independently. The color pixels (A and B) in the first row and the second row are may be electrically coupled to one another by the second exposure-control line TX2 in a "W" shape to control the exposure time of the color pixels independently.

Figure 20:
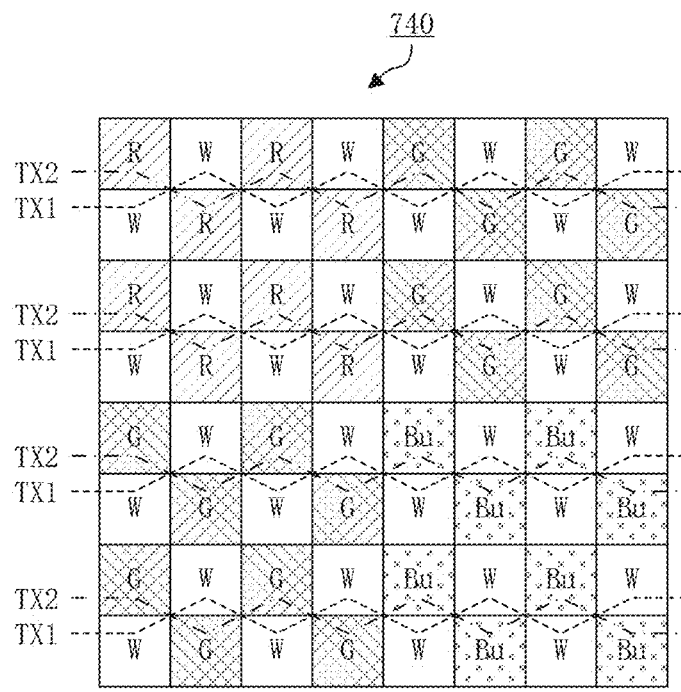
FIG. 20 is another schematic diagram of an arrangement of pixels in a repeating unit according to an embodiment of the present disclosure.

FIG. 19 is another schematic diagram of an arrangement of pixels in a repeating unit 730 according to an embodiment of the present disclosure. FIG. 20 is another schematic diagram of an arrangement of pixels in a repeating unit 740 according to an embodiment of the present disclosure. The embodiments shown in FIG. 19 and FIG. 20 correspond to the arrangements in FIG. 17 and FIG. 18. In FIGS. 19 and 20, the first color pixel A is the red pixel R, the second color pixel B is the green pixel G, and the third color pixel C is the blue pixel Bu.

For example, in some embodiments, the first color pixel A is the red pixel R, the second color pixel B is the yellow pixel Y, and the third color pixel C is the blue pixel Bu. In another example, the first color pixel A is the magenta pixel M, the second color pixel B is the cyan pixel Cy, and the third color pixel C is the yellow pixel Y. Embodiments of the present disclosure include but are not limited to this. For the specific connection of the circuit, please refer to the above description, which will not be repeated here.

It can be seen from the above embodiments shown in FIGS. 5-20, the image sensor includes color pixels and transparent pixels W arranged in a matrix. The color pixels and the transparent pixels are disposed at intervals in rows and columns. For example, the color pixels and the transparent pixels can be arranged alternatingly with each other in rows and in columns. In some embodiments, except for the pixels on the edge (or boundary) of the respective repeating unit, each transparent pixel is sandwiched by a pair of color pixels in the respective row and column, and each color pixel is sandwiched by a pair of transparent pixels in the respective row and column.

For example, in the row direction, one transparent pixel, one color pixel, one transparent pixel, and one color pixel, can be alternatingly disposed.

For example, in the column direction, one transparent pixel, one color pixel, one transparent pixel, and one color pixel, can be alternatingly disposed.

In some embodiments, the first exposure-control line TX1 is electrically coupled to control terminals TG (e.g., the gate electrode of transmission transistor 210) of exposure-control circuits 250 of transparent pixels in (2n−1)th and (2n)th rows. In some embodiments, the second exposure-control line TX2 is electrically coupled to control terminals TG (e.g., the gate electrode of the transmission transistor 210) of exposure-control circuits of color pixels in (2n−1)th and (2n)th rows. In some embodiments, n is a natural number (e.g., integer) greater than or equal to 1.

For example, when n is equal to 1, the first exposure-control line TX1 is electrically coupled to control terminals of exposure-control circuits of transparent pixels in the first and second rows, and the second exposure-control line TX2 is electrically coupled to control terminals of exposure-control circuits of color pixels in the first and second rows. When n is equal to 2, the first exposure-control line TX1 is electrically coupled to control terminals of exposure-control circuits of transparent pixels in the third and fourth rows, and the second exposure-control line TX2 is electrically coupled to control terminals of exposure-control circuits of color pixels in the third and fourth rows, and so on. The detailed description of the connection of first and second exposure-control lines TX1 and TX2 when n is equal to different values is omitted herein.

In some embodiments, the first exposure time is shorter than the second exposure time. In some embodiments, the ratio of the first exposure time to the second exposure time is one of 1:2, 1:3 or 1:4. For example, in the dark environment, color pixels are more prone to underexposure, and the ratio of the first exposure time to the second exposure time can be adjusted amongst 1:2, 1:3, and 1:4 according to the environment illumination. For example, when the exposure ratio is the above integer ratio or close to the integer ratio, it is advantageous for the setting of timing and the setting and control of signals.

Figure 21:
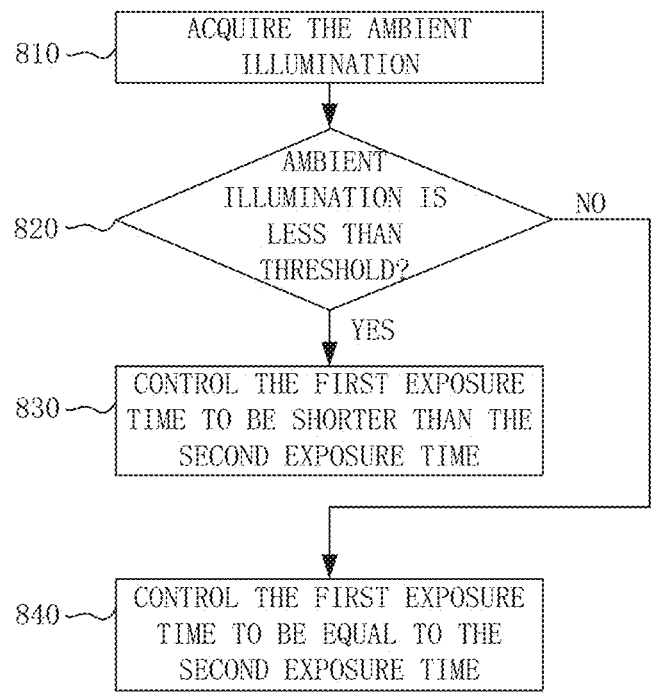
FIG. 21 is a flow chart showing an image acquisition method according to an embodiment of the present disclosure.

FIG. 21 is a flow chart showing an image acquisition method according to an embodiment of the present disclosure. As shown in FIG. 21, the method includes the following steps:

Step 810, the ambient illumination is acquired.

Step 820, it is determined whether the ambient illumination is less than the illumination threshold, if yes, the method proceeds to Step 830, and if no, the method proceeds to Step 840.

Step 830, the first exposure time is controlled to be shorter than the second exposure time.

Step 840, the first exposure time is controlled to be equal to the second exposure time.

For example, in the method, the first exposure time of transparent pixels in (2n−1)th and (2n)th rows can be controlled by using the first exposure signal, and the second exposure time of color pixels in (2n−1)th and (2n)th rows can be controlled by using a second exposure signal, n being a natural number greater than or equal to 1. The color pixels and the transparent pixels may be disposed at intervals in rows and columns. The first exposure time may be shorter than or equal to the second exposure time.

Figure 22:
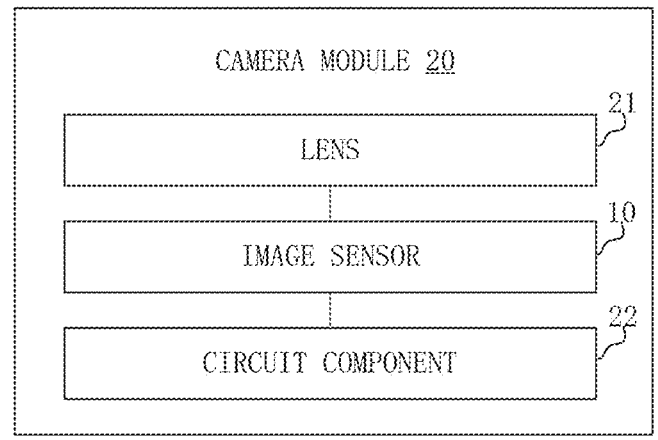
FIG. 22 is a schematic diagram of a camera module according to an embodiment of the present disclosure.

FIG. 22 is a schematic diagram of a camera module 20 according to an embodiment of the present disclosure. Camera module 20 may include the image sensor 10 according to any one of the embodiments in the present disclosure, a lens 21 used to image (e.g., focus an illumination of the image) onto the image sensor 10, and a circuit component 22. Image sensor 10 may be set on the focal plane of the lens 21 and generate electric charges when being illuminated. Circuit component 22 can collect and transmit electric charges generated by image sensor 10. Circuit component 22 can be electrically coupled to an external power source to obtain electrical energy, and can also be electrically coupled to a memory or a processor to transmit image data and/or control data.

For example, camera module 20 may be disposed along the back of the mobile phone as a rear camera. Understandably, camera module 20 may also be disposed along the front of the mobile phone as a front camera.

Figure 23:
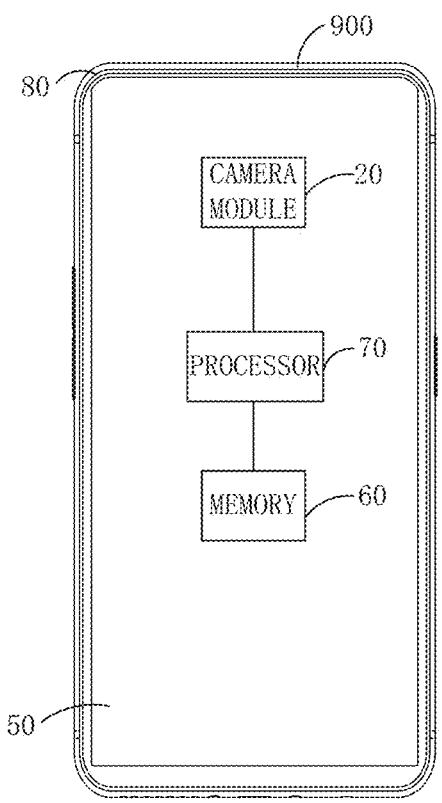
FIG. 23 is a schematic diagram of mobile terminal according to an embodiment of the present disclosure.

FIG. 23 is a schematic diagram of a mobile terminal 900 according to an embodiment of the present disclosure. Mobile terminal 900 may include camera module 20 according to any one of the embodiments of the present disclosure.

Mobile terminal 900 may further includes a display component 50, a memory 60, a processor 70, and a structure component 80. Camera module 20 may disposed along structure component 80, which can include any suitable support/mounting structure. For example, structure component 80 may include a middle frame and a backplane, and camera module 20 may be fixed on the middle frame or the backplane.

Memory 60 may be used to store the image acquired by camera module 20. Processor 70 may be used to process the image acquired by camera module 20. Computer program can be stored in memory 60. When the processor 70 executes the computer program, the image acquisition method of the embodiment of the present disclosure can be implemented. Display component 50 may be used to display the image acquired by camera module 20. In some embodiments, memory 60 is a non-transitory memory.

In various embodiments, mobile terminal 900 can be a mobile phone, a tablet computer, a laptop computer, a smart bracelet, a smart watch, a smart helmet, smart glasses, and so on. In the embodiments of the present disclosure, the mobile phone is taken as an example for description. It can be understood that, the mobile terminal may be another form, which is not limited herein.

The embodiments described hereinabove are only some embodiments of the present application and should not be interpreted as limitation to the present application. Any equivalent structure or equivalent process transformation made by using the description and drawings of this application, or directly or indirectly used in other related technical fields, are also deemed to fall into the protection scope of the present application.

What is claimed is:

1. An image sensor, comprising:
   a repeating unit in a two-dimensional pixel array, the repeating unit comprising a plurality of color pixels and a plurality of transparent pixels,
   wherein in the repeating unit, the plurality of transparent pixels are disposed along a first diagonal line and one or more first parallel lines parallel to the first diagonal line, and the color pixels are disposed along a second diagonal line and one or more second parallel lines parallel to the second diagonal line, the first diagonal line being different from the second diagonal line;
   wherein the repeating unit includes 16 pixels arranged in 4 rows and 4 columns and pixels in the minimal arrangement unit are imaged individually or binning, and
   wherein in a binning mode:
      signals of pixels at a $1^{st}$ row and a $1^{st}$ column and at a $2^{nd}$ row and a $2^{nd}$ column are combined into one pixel signal,
      signals of pixels at the $1^{st}$ row and the $2^{nd}$ column and at the $2^{nd}$ row and the $1^{st}$ column are combined into one pixel signal,
      signals of pixels at the $1^{st}$ row and a $3^{rd}$ column and at the $2^{nd}$ row and a $4^{th}$ column are combined into one pixel signal,
      signals of pixels at the $1^{st}$ row and the $4^{th}$ column and at the $2^{nd}$ row and the $3^{rd}$ column are combined into one pixel signal,
      signals of pixels at a $3^{rd}$ row and the $1^{st}$ column and at a $4^{th}$ row and the $2^{nd}$ column are combined into one pixel signal,
      signals of pixels at the $3^{rd}$ row and the $2^{nd}$ column and at the $4^{th}$ row and the $1^{st}$ column are combined into one pixel signal,
      signals of pixels at the $3^{rd}$ row and the $3^{rd}$ column and at the $4^{th}$ row and $4^{th}$ column are combined into one pixel signal, and
      signals of pixels at the $3^{rd}$ row and the $4^{th}$ column and at the $4^{th}$ row and $3^{rd}$ column are combined into one pixel signal.

2. The image sensor of claim 1, wherein a first exposure time of at least two adjacent transparent pixels along the first diagonal line is controlled by a first exposure signal, and a second exposure time of at least two adjacent color pixels along the second diagonal line is controlled by a second exposure signal, the first exposure signal being different from the second exposure signal.

3. The image sensor of claim 2, wherein the first exposure time is shorter than or equal to the second exposure time.

4. The image sensor of claim 3, wherein a ratio of the first exposure time to the second exposure time is one of 1:2, 1:3 or 1:4.

5. The image sensor of claim 2, further comprising:
   a first exposure-control line electrically coupled to control terminals of exposure-control circuits of at least two adjacent transparent pixel on the first diagonal line; and
   a second exposure-control line electrically coupled to control terminals of exposure-control circuits of at least two adjacent color pixel on the second diagonal line, wherein
   the first exposure signal is transmitted by the first exposure-control line, and the second exposure signal is transmitted by the second exposure-control line.

6. The image sensor of claim 5, wherein
   the first exposure-control line is disposed as "W" shape, and the at least two adjacent transparent pixels are disposed in adjacent two rows; and
   the second exposure-control line is disposed as "W" shape, and the at least two adjacent color pixels are disposed in adjacent two rows.

7. The image sensor of claim 5, each pixel further comprising a photoelectric conversion element, wherein the exposure-control circuit is electrically coupled to the photoelectric conversion element to transmit electric charges generated by the photoelectric conversion element.

8. The image sensor of claim 7, wherein the exposure-control circuit includes a transmission transistor, and the control terminal of the exposure-control circuit includes a gate electrode of the transmission transistor.

9. The image sensor of claim 1, wherein the repeating unit includes 16 pixels arranged in 4 rows and 4 columns as:

| W | A | W | B |
| A | W | B | W |
| W | B | W | C |
| B | W | C | W, | wherein W represents the transparent pixels, A represents first color pixels of the color pixels, B represents second color pixels of the color pixels, and C represents third color pixels of the color pixels, A, B, and C being different from one another.

10. The image sensor of claim 1, wherein the repeating unit includes 16 pixels arranged in 4 rows and 4 columns as:

| A | W | B | W |
|---|---|---|---|
| W | A | W | B |
| B | W | C | W |
| W | B | W | C, | wherein W represents the transparent pixels, A represents first color pixels of the color pixels, B represents second color pixels of the color pixels, and C represents third color pixels of the color pixels, A, B, and C being different from one another.

11. The image sensor of claim 1, wherein the repeating unit includes 36 pixels arranged in 6 rows and 6 columns as:

| W | A | W | B | W | B |
|---|---|---|---|---|---|
| A | W | A | W | B | W |
| W | A | W | B | W | B |
| B | W | B | W | C | W |
| W | B | W | C | W | C |
| B | W | B | W | C | W, | wherein W represents the transparent pixels, A represents first color pixels of the color pixels, B represents second color pixels of the color pixels, and C represents third color pixels of the color pixels, A, B, and C being different from one another.

12. The image sensor of claim 1, wherein the repeating unit includes 36 pixels arranged in 6 rows and 6 columns as:

| A | W | A | W | B | W |
|---|---|---|---|---|---|
| W | A | W | B | W | B |
| A | W | A | W | B | W |
| W | B | W | C | W | C |
| B | W | B | W | C | W |
| W | B | W | C | W | C, | wherein W represents the transparent pixels, A represents first color pixels of the color pixels, B represents second color pixels of the color pixels, and C represents third color pixels of the color pixels, A, B, and C being different from one another.

13. The image sensor of claim 1, wherein the color pixels comprise:
   first color pixels A comprising red pixels R;
   second color pixels B comprising one of green pixels G and yellow pixels Y; and
   third color pixels C comprising blue pixels Bu.

14. The image sensor of claim 1, wherein the color pixels comprise:
   first color pixels A comprising magenta pixels M;
   second color pixels B comprising cyan pixels Cy; and
   third color pixels C comprising yellow pixels Y.

15. The image sensor of claim 1, wherein a spectral response band of the transparent pixels corresponds to visible spectrum.

16. The image sensor of claim 1, wherein a spectral response band of the transparent pixels corresponds to visible and near infrared spectrum, and matches the response spectrum of a photodiode in the image sensor.

17. A camera module, comprising:
a lens configured to focus an illumination of an image onto the image sensor;
the image sensor configured to convert the illumination to electric charges, the image sensor comprising a plurality of color pixels and a plurality of transparent pixels arranged in a two-dimensional array, a repeating unit being in the two-dimensional pixel array, wherein the plurality of transparent pixels are disposed along a first diagonal line and one or more first parallel lines parallel to the first diagonal line, and the color pixels are disposed along a second diagonal line and one or more second parallel lines parallel to the second diagonal line, the first diagonal line being different from the second diagonal line; and
a circuit component configured to collect and transmit the electric charges, acquire electrical energy for the camera module, and transmit data,
wherein the repeating unit includes 16 pixels arranged in 4 rows and 4 columns and pixels in the minimal arrangement unit are imaged individually or binning, and
wherein in a binning mode:
   signals of pixels at a $1^{st}$ row and a $1^{st}$ column and at a $2^{nd}$ row and a $2^{nd}$ column are combined into one pixel signal,
   signals of pixels at the $1^{st}$ row and the $2^{nd}$ column and at the $2^{nd}$ row and the $1^{st}$ column are combined into one pixel signal,
   signals of pixels at the $1^{st}$ row and a $3^{rd}$ column and at the $2^{nd}$ row and a 4th column are combined into one pixel signal,
   signals of pixels at the $1^{st}$ row and the $4^{th}$ column and at the $2^{nd}$ row and the $3^{rd}$ column are combined into one pixel signal,
   signals of pixels at a $3^{rd}$ row and the $1^{st}$ column and at a $4^{th}$ row and the $2^{nd}$ column are combined into one pixel signal,
   signals of pixels at the $3^{rd}$ row and the $2^{nd}$ column and at the $4^{th}$ row and the 1st column are combined into one pixel signal,
   signals of pixels at the $3^{rd}$ row and the $3^{rd}$ column and at the $4^{th}$ row and 4th column are combined into one pixel signal, and
   signals of pixels at the $3^{rd}$ row and the $4^{th}$ column and at the $4^{th}$ row and $3^{rd}$ column are combined into one pixel signal.

18. A mobile terminal, comprising:
a camera module for sensing an image, the camera comprising:
a lens configured to focus an illumination of the image onto the image sensor;
the image sensor configured to convert the illumination to electric charges, the image sensor comprising a plurality of color pixels and a plurality of transparent pixels arranged in a two-dimensional array, a repeating unit being the two-dimensional pixel array, wherein the plurality of transparent pixels are disposed along a first diagonal line and one or more first parallel lines parallel to the first diagonal line, and the color pixels are disposed along a second diagonal line and one or more second parallel lines parallel to the second diagonal line, the first diagonal line being different from the second diagonal line; and
a circuit component configured to collect and transmit the electric charges, acquire electrical energy for the camera module, and transmit data, a processor configured to process the image acquired by the camera module, a memory configured to store the image acquired by the camera module, a display component configured to display the image acquired by the camera module, and a structure component configured to provide support to the camera module, wherein the repeating unit includes 16 pixels arranged in 4 rows and 4 columns and pixels in the minimal arrangement unit are imaged individually or binning, and wherein in a binning mode:

signals of pixels at a $1^{st}$ row and a $1^{st}$ column and at a $2^{nd}$ row and a $2^{nd}$ column are combined into one pixel signal, signals of pixels at the $1^{st}$ row and the $2^{nd}$ column and at the $2^{nd}$ row and the $1^{st}$ column are combined into one pixel signal, signals of pixels at the $1^{st}$ row and a $3^{rd}$ column and at the $2^{nd}$ row and a $4^{th}$ column are combined into one pixel signal, signals of pixels at the $1^{st}$ row and the $4^{th}$ column and at the $2^{nd}$ row and the $3^{rd}$ column are combined into one pixel signal, signals of pixels at a $3^{rd}$ row and the $1^{st}$ column and at a $4^{th}$ row and the $2^{nd}$ column are combined into one pixel signal, signals of pixels at the $3^{rd}$ row and the $2^{nd}$ column and at the $4^{th}$ row and the $1^{st}$ column are combined into one pixel signal, signals of pixels at the $3^{rd}$ row and the $3^{rd}$ column and at the $4^{th}$ row and 4th column are combined into one pixel signal, and signals of pixels at the $3^{rd}$ row and the $4^{th}$ column and at the $4^{th}$ row and $3^{rd}$ column are combined into one pixel signal.

* * * * *